US012125108B1

(12) United States Patent
Maney et al.

(10) Patent No.: US 12,125,108 B1
(45) Date of Patent: Oct. 22, 2024

(54) AUGMENTED REALITY AND/OR VIRTUAL REALITY USAGE IN RISK ASSESSMENT TECHNIQUES (71) Applicant: United Services Automobile Association (USAA), San Antonio, TX (US)

(72) Inventors: Will Kerns Maney, San Antonio, TX (US); Sacha Melquiades De'Angeli, San Antonio, TX (US); Mark Paxman Warnick, San Antonio, TX (US); Elena Marie Carrasco, Converse, TX (US); Jennifer Hunt Erickson, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 68 days.

(21) Appl. No.: 17/684,027

(22) Filed: Mar. 1, 2022

Related U.S. Application Data (60) Provisional application No. 63/155,143, filed on Mar. 1, 2021.

(51) Int. Cl.
G06T 11/00 (2006.01)
G06F 3/14 (2006.01)
G06Q 40/08 (2012.01)
G06V 10/46 (2022.01)
G06V 20/20 (2022.01)
G08B 21/18 (2006.01)
G16Y 10/80 (2020.01)

(52) U.S. Cl.
CPC ............... *G06Q 40/08* (2013.01); *G06F 3/14* (2013.01); *G06T 11/00* (2013.01); *G06V 10/46* (2022.01); *G06V 20/20* (2022.01); *G08B 21/182* (2013.01); *G16Y 10/80* (2020.01)

(58) Field of Classification Search
None
See application file for complete search history.

(56) References Cited

U.S. PATENT DOCUMENTS

| 10,558,226 | B1* | 2/2020 | Bigdeli ................. G06V 10/22 |
| 2016/0026868 | A1* | 1/2016 | Wexler ................. G06F 16/532 |
| | | | 382/103 |
| 2017/0032466 | A1* | 2/2017 | Feldman ................ G06Q 50/16 |
| 2020/0004384 | A1* | 1/2020 | Aggarwal .......... G06Q 30/0643 |
| 2020/0242360 | A1* | 7/2020 | Alexander ............. G06N 20/00 |
| 2021/0042843 | A1* | 2/2021 | Bryant ................... G06Q 10/10 |
| 2021/0311545 | A1* | 10/2021 | Bae ......................... G06T 11/60 |
| 2022/0067547 | A1* | 3/2022 | Kwatra ................... G06N 5/04 |

* cited by examiner

*Primary Examiner* — Yi Wang
(74) *Attorney, Agent, or Firm* — Fletcher Yoder, P.C.

(57) ABSTRACT

A memory storing processor executable instructions, and a processor configured to execute the processor executable instructions, wherein execution of the processor executable instructions causes the processor to perform operations including receiving image data from an image sensor configured to acquire images in a home, identifying objects in the image data, accessing one or more databases storing risk data associated with the objects in the image data, and, in response to risk data of a particular object in the image data exceeding a threshold, sending, to a device, a notification comprising an indication of the particular object as a high-risk object.

3 Claims, 5 Drawing Sheets

AUGMENTED REALITY AND/OR VIRTUAL REALITY USAGE IN RISK ASSESSMENT TECHNIQUES

The present application claims benefit of and priority to U.S. Provisional Patent Application Ser. No. 63/155,143, titled "AUGMENTED REALITY AND/OR VIRTUAL REALITY USAGE IN RISK ASSESSMENT TECHNIQUES," which was filed on Mar. 1, 2021, and which is herein incorporated by reference in its entirety for all purposes.

BACKGROUND

This section is intended to introduce the reader to various aspects of art that may be related to various aspects of the present disclosure, which are described and/or claimed below. This discussion is believed to help provide the reader with background information to facilitate a better understanding of the various aspects of the present disclosure. Accordingly, it is understood that these statements are to be read in this light, and not as admissions of prior art.

Information deficiency may result in high costs for a party. For example, a person can buy a car that may have to be recalled or a house that may have a high risk of fire. Without knowing certain relevant information, a person may be more liable to having an undesirable and costly experience with a product and/or property. Accordingly, it is now recognized that systems and methods for increasing awareness of risks for products and/or properties are needed.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a system includes a memory storing processor executable instructions and a processor that enables execution of the processor executable instructions. The execution of the processor executable instructions causes the processor to perform operations including receiving image data from an image sensor configured to acquire images in a home, and identifying objects in the image data. Further, the operations include accessing one or more databases storing risk data associated with the objects in the image data, and in response to risk data of a particular object in the image data exceeding a threshold, sending, to a device, a notification comprising an indication of the particular object as a high-risk object.

In another embodiment, a system includes a database storing risk information and associations between the risk information and objects, an image sensor to acquire image data in a property, and a computing device configured to perform operations. The computing device operations include receiving the image data from the image sensor, identifying an object in the property based on the image data, and querying the database to identify particular risk information associated with the object in the property. Additionally, the operations include causing display, on a display, of a report indicating at least a portion of the particular risk information associated with the object in the property.

In an additional embodiment, a tangible, non-transitory, and computer readable medium storing instructions that, when executed by a processor of a computing device, causes the computing device to perform operations including receiving image data from an image sensor, and identifying an object in a property based on the image data. The operations further include querying a database storing risk information associated with the object, and causing display, on a display, of a report indicating the risk information of the object in the property.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

The present disclosure generally relates to systems and methods for determining and presenting risk information.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. It should be noted that the term "multimedia" and "media" may be used interchangeably herein.

Present embodiments relate to systems and methods for determining and providing risk information for objects via an augmented or virtual reality experience. For example, using various observational techniques, present embodiments facilitate detection and determination of risk information for objects (e.g., a house, a car) and then presentation of such information in an intuitive manner via modified reality which, as used herein, includes systems and techniques for providing virtual reality and augmented reality. Present embodiments include a processor that may receive image data from an image sensor configured to acquire images (e.g., in a home), identify objects in the image data, and access one or more databases storing risk data associated with the objects in the image data. This may include risk data associated with groupings of objects and may be based on relative associations (e.g., positioning of objects relative to one another or under certain conditions). The processor may also send, to a device, a notification including an indication of the particular object as a high-risk object, in response to risk data of the particular object in the image data exceeding a threshold. Accordingly, in an embodiment, pertinent parties may become aware of risks associated with a property, and may make decisions based on the information collected, analyzed, and presented to them via the present embodiments.

Figure 1:
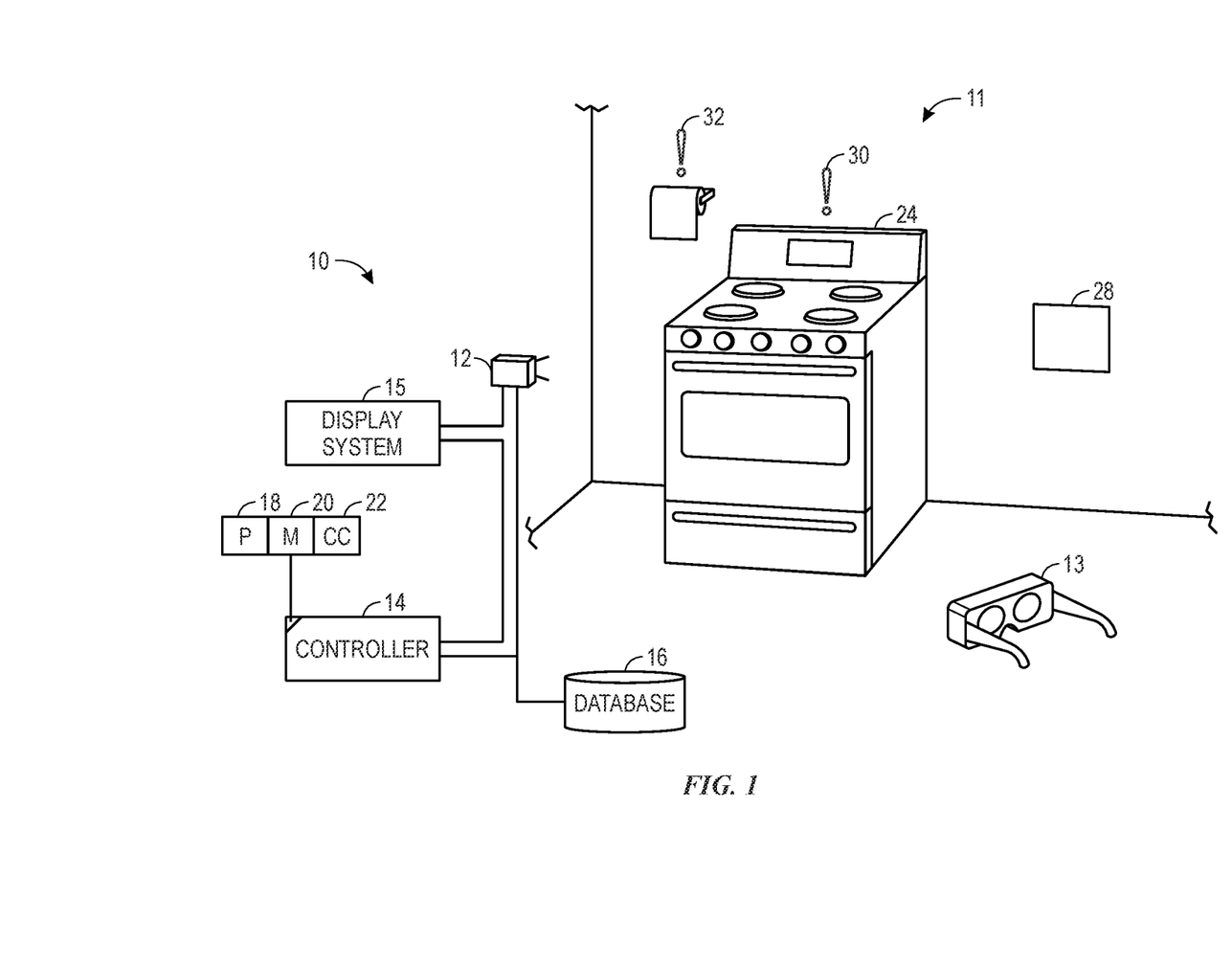
FIG. 1 is a schematic perspective view of a system for determining and providing risk information for objects used in a home, in accordance with embodiments described herein.

Turning to the figures, FIG. 1 is a schematic perspective view of a system 10 for determining and providing risk information for objects, in accordance with embodiments described herein. The schematic perspective view of FIG. 1 may include a view as provided through a viewer system (e.g., AR/VR goggles) 13 for providing a modified reality. In the illustrated embodiment, the system 10 is incorporated with a home 11, which is representative of any of various locations (e.g., an office, a warehouse, or a storage facility) in accordance with present embodiments. The system 10 includes an image sensor 12 (e.g., a camera), a controller 14, an augmented reality/virtual reality (AR/VR) display system 15 (also referred to as a modified reality display system 15), and database(s) 16. The image sensor 12 may be part of a drone, a robotic vacuum, a camera, a smart phone, or another suitable device. The image sensor 12 may also represent a plurality of image sensors or cameras utilized throughout or installed about the home 11. In the illustrated embodiment, the image sensor 12 is configured to acquire image data in the home 11 (e.g., the property). The image sensor 12 is communicatively coupled to the controller 14. As such, the controller may communicate instructions to the image sensor 12 and the image sensor 12 may perform the instruction and/or acquire and send image data to the controller 14.

The controller 14 includes a processor 18, a memory 20 storing instructions that are executable by the processor 18, and a communication component 22. The instructions may include instructions to carry out one or more of the techniques disclosed herein. The processor 18 may be any type of computer processor or microprocessor capable of executing computer-executable code. The processor 18 may also include one or more processors (e.g., multiple processors) that may cooperate to perform the operations described herein. In particular, the one or more processors, as represented by processor 18, may include multiple microprocessors, one or more "general-purpose" microprocessors, one or more special-purpose microprocessors, and/or one or more application specific integrated circuits (ASICs), or some combination thereof. For example, the one or more processors may include one or more reduced instruction set (RISC) processors.

The memory 20 may represent one or more memory devices that may store information such as control software, look up tables, configuration data, etc. Cloud computing may be employed in accordance with present embodiments. The memory 20 may include a tangible, non-transitory, machine-readable-medium, such as a volatile memory (e.g., a random access memory (RAM)) and/or a nonvolatile memory (e.g., a read-only memory (ROM)). The memory 20 may store a variety of information (e.g., instructions and data) and may be used for various purposes. For example, the memory 20 may store machine-readable and/or processor-executable instructions (e.g., firmware or software) for the processor 18 to execute, such as instructions for determining and presenting risk information on display devices. The memory 20 may also include one or more storage devices (e.g., nonvolatile storage devices) that may include read-only memory (ROM), flash memory, a hard drive, or any other suitable optical, magnetic, or solid-state storage medium, or a combination thereof. As such, the memory 20 may be any suitable articles of manufacture that can serve as media to store processor-executable code, data, or the like. In addition, one or more components of the system 10 may operate and/or be physically located in a remote location.

The controller 14 also includes a communication component 22, which may allow the controller 14 to communicate via any suitable wired or wireless medium, with various devices such as the image sensor 12 and the database(s) 16. It should be noted that in some embodiments, the controller 14 may include other components such as a display configured to display information associated with the risks of an object.

The system 10 also includes or coordinates with the database(s) 16. The database(s) 16 may include public databases and private databases. For example, the public databases may include data generally available to the public, while the private databases may include data that is generally unavailable to the public. Such public databases may include previous and present weather information corresponding to specific geographical locations, recalls on objects (e.g., a product recall for a car), risk values associated with objects, etc. Such private databases may include data corresponding to patterns of a member acquired via specific Internet of Things (IoT) devices (e.g., sensors coupled to appliances) installed in the home 11. In addition, the database(s) 16 may include national databases, government databases, local databases, homeowner databases, etc.

The image sensor 12 may acquire image data of the home 11, and send the image data to the controller 14. The controller 14 may receive the image data and identify objects in the image data. For example, the image data may include imagery of the stove 24 (e.g., the first object), the paper towel roll 26 (e.g., the second object), and a third object 28 (e.g., a window, roof, electronic appliance, floor, wall, pipes behind a wall). Some objects (e.g., the third object 28) may be detectable behind other objects or structures by the system 10 via light detection and ranging (LIDAR) techniques, which may allow objects located behind a wall, for example, to be detected. Other objects, such as the stove 24, may be part of an Internet of Things (IoT) ecosystem in the home 11, and as such, may communicate data regarding its status (e.g., on/off, temperature) and usage to a database of a cloud computing system. In some embodiments, the data communicated to the database may be used and accessed by the controller 14 to determine risk associated with the stove. The controller 14 may also identify the objects via processing data in the image data (e.g., through a visual recognition algorithm that identifies a shape of an object or another visual aspect, such as barcode information on the object) and determine a likely object type based on the shape and/or other (e.g., barcode) information.

Based on imagery acquired by the image sensor 12, the controller 14 may identify one or more of the stove 24, the paper towel roll 26, and the third object 28 by, for example, identifying physical features of the stove 24, the paper towel roll 26, and the third object 28 represented in the imagery. Further, the controller 14 may send indications of the identified features to the database(s) 16 as part of a query of the database(s) 16 to determine a type and/or model of the stove 24, the paper towel roll 26, and the third object 28. Additionally, the identified features may be sent to a machine-learning algorithm configured to determine a type of object, a model of the object, a manufacturer of the object, and/or the like of the stove 24, the paper towel roll 26, and/or the third object 28.

In response to identifying one or more of the stove 24, the paper towel roll 26, and the third object 28, the controller 14 may access the database(s) 16 storing risk data associated with the one or more of the stove 24, the paper towel roll 26, and the third object 28. The database(s) 16 may contain risk information corresponding to the objects and associations between the risk information and the objects. The controller 14 may access the private database, the public database, or both, based on characteristics of the object to determine a level of risk associated with the object in the home 11. For example, the controller 14 may determine, based upon accessing a database, that the stove 24 has an active recall notice associated with it. Association of the stove 24 with the active recall notice may cause the controller 14 to determine that the risk level of the object (i.e., the stove 24) exceeds a threshold risk level. Accordingly, in response to determining that the stove 24 has the associated active recall notice, the controller 14 may send, to a device (e.g., mobile phone, laptop), a notification that includes an indication of the stove 24 as being a high-risk object.

The illustrated embodiment of FIG. 1 may be at least partially representative of a view of the objects (i.e., the stove 24, the paper towel roll 26, and the third object 28) as part of a modified reality, which may be presented via observation through the viewer system 13 (e.g., augmented or virtual reality glasses). For example, the stove 24 has an indication 30 (e.g., an exclamation point) virtually displayed on top of it (as seen through the viewer system 13) to indicate the stove has a high-risk status. Indications, such as the indication 30, may be provided via the AR/VR display system 15, which may include the viewing system 13. The AR/VR display system 15 may include an augmented reality display system, a virtual reality display system, or both an augmented reality display system component and a virtual reality display system component. Indeed, an augmented reality display system may display dynamic imagery based upon the image data from the image sensor 12. The dynamic imagery may include the indication that the stove is a high-risk object or even more detailed data about insurance coverage corresponding to a level of risk. The indication 30 may also include or facilitate access to a recommended insurance or warranty policy change to help the member prepare for a potential claim including the high-risk object. For example, a user may be able to interact virtually (e.g., via a website link) with the indication 30 to obtain more information. By correlating spatial information obtained based on the imagery acquired from the image sensor 12 and the indication 30, the AR/VR system 15 may make the indication 30 appear to be positioned in three-dimensional space in an intuitive position relative to the position of the object of interest, which is the stove 24 in the present example.

In some cases, the controller 14 may determine a relationship (e.g., distance and relative orientation) between two objects and determine a risk value based upon that relationship. For example, in the illustrated embodiment, the image sensor 12 may capture an image of the stove 24 and the paper towel roll 26 being proximate to each other past a threshold distance or the paper towel 26 in an orientation above the stove 24. Since paper towels are generally flammable, the risk data associated with the stove 24, the paper towel 26 and a corresponding likelihood of fire may cause an elevated risk assessment value. In the illustrated embodiment, the paper towel roll 26 has an indication 32 (e.g., an exclamation point) on top of it, as viewed through the viewer system 13, to indicate that the paper towel roll 26 is a high-risk object due to its proximity to the stove 24. Additional information (e.g., an explanation of the assessment) may be presented as the indication 32 or be accessible via the indication 32, which may operate as a link in the virtual or augmented reality provided by the AR/VR system 15. Using techniques and system features such as those described above, risk data determined by the controller 14 may vary for particular objects based contextual data (e.g., relationship to other objects or other contextual conditions, such as environmental conditions) associated with the risk data in the database(s) 16.

It may be useful to use the AR/VR display system 15 to allow a member to view an object undergoing a hypothetical disruptive event. For example, such systems may be used to help members determine specific types of insurances or warranties that are preferred for an object such as the house 11. Data from sensors coupled to the object, as well as data about a geographical location of the object, may be used to create a hypothetical claim situation. For example, if a member is in an area that commonly has flooding, the AR/VR display system 15 may be used to show a realistic view of what the member's home may look like with flooding. As another example, if hurricanes are common in an area, the system 10 may be utilized to show broken windows and a roof being replaced. Such a system may help a member get a sense of a claim situation to help prevent claims from happening and/or to prepare a person for a potential disruptive event. For example, using the system 10, a member may be assisted in deciding whether to get an impact resistant roofing material if they have a visualization to justify an increased cost associated with the impact resistant roofing material.

Figure 2:
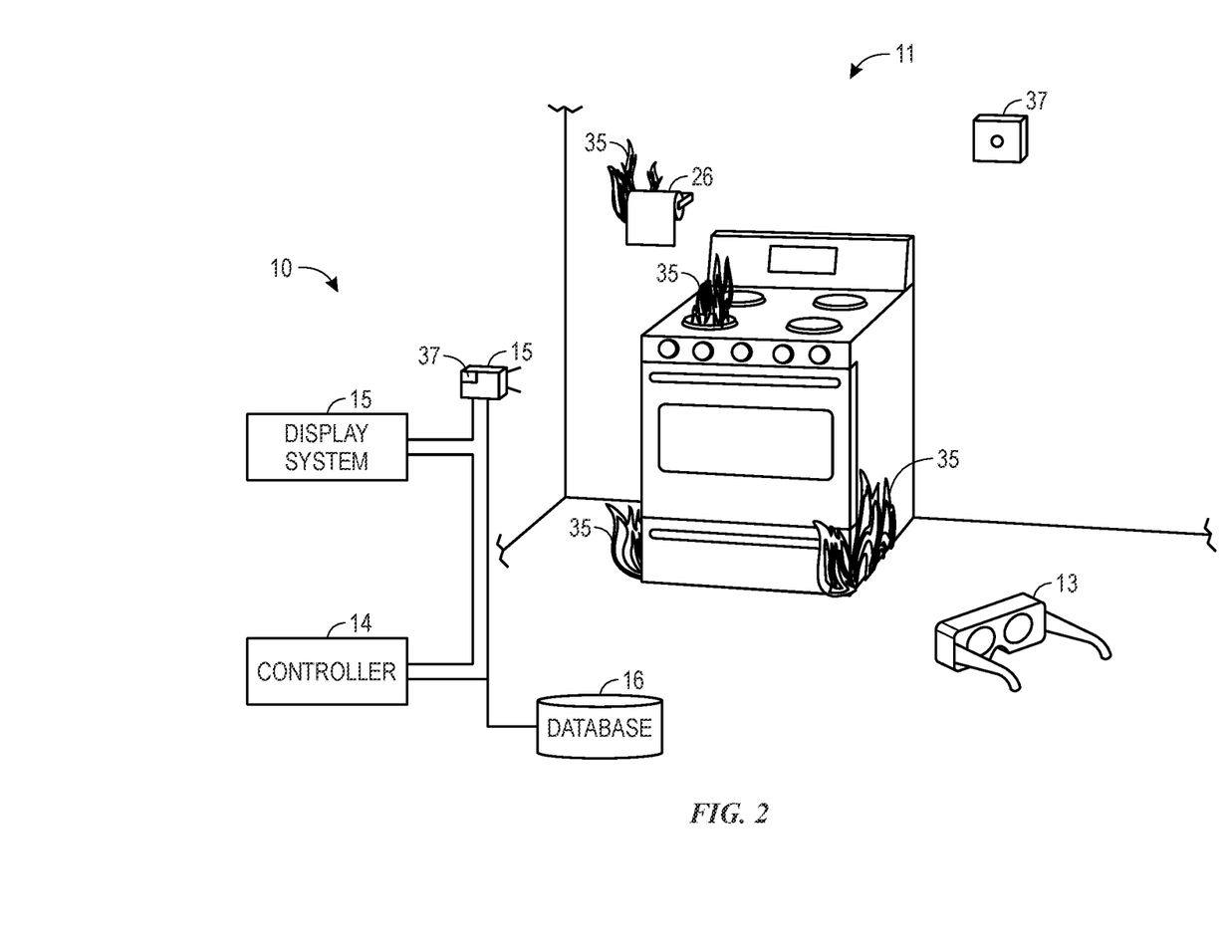
FIG. 2 is schematic perspective view of the system for determining and providing risk information for objects of FIG. 1, wherein the system includes an augmented reality and/or virtual reality display system configured to display an object in a hypothetical disruptive event, in accordance with embodiments described herein.

With this in mind, FIG. 2 illustrates the system 10 using the AR/VR display system 15 to display an object in a hypothetical disruptive event, in accordance with embodiments described herein. A hypothetical disruptive event may include flooding, a hurricane, a wildfire, a tornado, or any other disruptive or destructive event. Based upon a common disruptive event that may occur in an area, the controller 14 may send, to the AR/VR display system 15, a hypothetical disruptive event to simulate. In the illustrated embodiment, the simulated hypothetical disruptive event is a fire, as represented by virtual flames 35, which would be viewable via the AR/VR display system 15. The member may be able to physically walk or otherwise proceed through the home 11 as it is in the fire. For example, a location sensor 37 may be in the home 11 or a portable device (e.g., integrated with a smart phone that includes the image sensor 12) and may allow the member's location (and viewing perspective) to be tracked in the home 11. The location of the member may be used by the AR/VR display system 15 to augment objects in the home 11 that the member is near (including hidden items like pipes behind walls). In some cases, the location tracking services may be utilized via Wi-Fi signals in the home 11. In response to seeing such hypothetical disruptive event, a member may be motivated to acquire fire insurance for the home 11. As another example, if a nearby neighborhood has a wildfire, the controller 14 may send, to the AR/VR display system 15, a recommendation to reduce a rate of a spread of fire. For example, the recommendation may include a recommendation to clear vegetation near the home. The recommendation may be illustrated via the AR/VR display system 15 as an illustration of the home 11 without vegetation surrounding the home. In addition, the recommendation may include a recommendation to change one or more physical aspects (e.g., a lack of fence around a yard) of the home 11 to reduce risk associated with the home 11. For example, the AR/VR display system 15 may be used to help the member visualize a financial and risk-based goal of installing a fence, a fire friendly landscape or a fire suppression system that may be costly.

Figure 3:
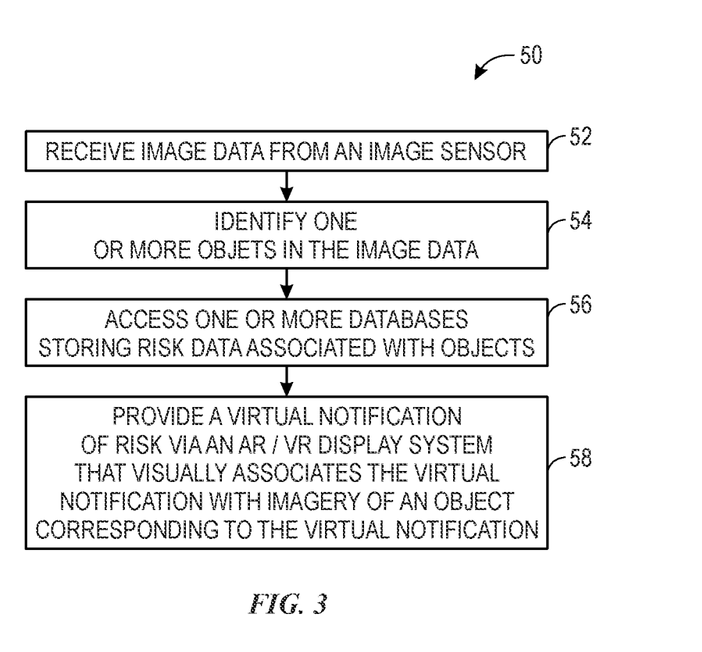
FIG. 3 illustrates a method for determining and providing risk information for objects, in accordance with embodiments described herein.

FIG. 3 illustrates a method 50 for causing a virtual reality display system to display builds of an object to facilitate visualizing goal statuses, in accordance with embodiments described herein. The method 50 may be stored as instructions in the controller and likewise may be performed by one or more components of the system 10 of FIGS. 1 and 2 (e.g., the controller 14, the AR/VR display system 15). A computing device or a processor may perform one or more blocks of the method 50.

The method 50 includes receiving (block 52) image data from an image sensor configured to acquire images in a home. The image sensor may include any suitable image sensor of a cell phone, laptop, security camera, etc.

The method 50 includes identifying (block 54) objects in the image data. The identification of the objects may include identifying a type of the object, a model, a manufacturer, a geographical location of the object, a location of the object relative to one or more objects in the home, and so forth. Identifying the objects may be based on comparing acquired image data with image templates, shape recognition algorithms, lookup tables, markers (e.g., barcode), and/or the like.

The method 50 includes accessing (block 56) one or more databases storing risk data associated with the objects in the image data. For example, a database may be queried to determine risk information associated with one or more objects in the image data. The database may store risk information and associations between the risk information and objects.

The method 50 includes, in response to risk data of a particular object in the image data exceeding a threshold, sending (block 58), to a device, a notification comprising an indication of the particular object as a high-risk object. In some cases, this step includes causing display, on a display, of a report indicating at least a portion of the particular risk information associated with the object in the property. In some embodiments, all or a sub-set of all identified risk data may be displayed an indication or notification based on threshold comparisons or based on acquisition of risk information alone. For example, a scale of 1 to 10 may be associated with risk and all objects having any identified level of risk may be associated with a virtual indication of the identified level of risk. However, in other embodiments, higher levels of risk may be required before virtual display of the risk level is initiated.

The AR/VR display system 15 may also be used to help a member visualize goals, which may provide for an emotional connection to a specific goal. For example, a member may have a goal to go on a vacation or buy a new appliance. With respect to the vacation example, the vacation may include one or more locations and specific things to do at the one or more locations. The vacation may be broken into experiences that the member can attain and unlock in the AR/VR display system 15, as the member saves towards the vacation. Accordingly, gamification may be integrated into the system 10 to encourage the member to proceed toward a next step in realizing the goal/experience. The controller 14 may send data to the AR/VR display system 15 indicative of the specific goal that the member has, which may be input by the user into the controller 14 via another device (e.g., a smart phone or laptop). The data sent to the AR/VR display system 15 may include a build (e.g., a ghost build) of the specific goal in the augmented reality/virtual reality space. As the member saves in an account corresponding to the goal, the controller 14 may send additional data to the AR/VR display system 15, which may then be used to fill the build of the member's goal.

Figure 4:
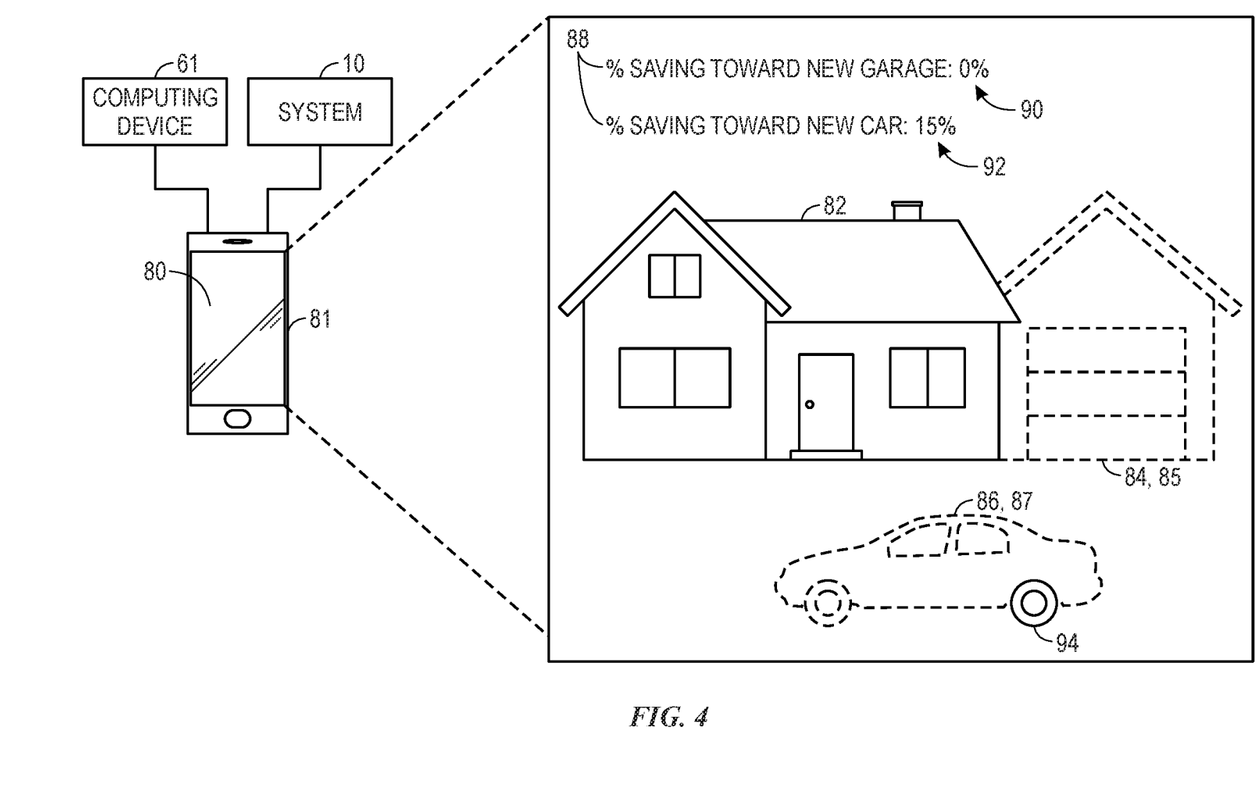
FIG. 4 is an embodiment of a computing device configured to access financial data and cause builds of objects to be displayed on a display of a virtual reality display system based on the financial data, in accordance with embodiments described herein.

With this in mind, FIG. 4 is an embodiment of a computing device 61 configured to display builds of goals to be displayed on a display 80 (e.g., a screen of a smart phone or computer 81) of the AR/VR display system 15, in accordance with embodiments described herein. The computing device 61 may be integral with or separate from and in communication with the system 10. In the illustrated embodiment, the AR/VR display system 15 is coupled to the smart phone or computer 81, which may likewise be communicatively coupled to the controller 14 of the system 10.

The display 80 includes an image representative of a property 82 (e.g., a house) corresponding to a user, a build 84 (e.g., a ghost version, an image) of a garage 85, and a build 86 (e.g., a ghost version, an image) of a car 87. The garage 85 and the car 87 may be planned future purchases for which the member desires to save. The image of the property 82 may have been acquired via the image sensor 12 of the system 10, and the controller 14 may have instructed the AR/VR display system 15 to display the builds 84 and 86 about the property 82. The builds 84 and 86 correspond to the builds of the garage 85 and of the car 87 that are not yet completely filled which, in some embodiments, may indicate that the member has not put any money in any account corresponding to the garage 85 or the car 87.

The builds 84 and 86 may be built or filled with substance (e.g., more detailed graphics) as the member saves towards the specific goal. Similarly, the builds 84 and 86 of the garage 85 and of the car 87, respectively, may be deconstructed as the member removes funds from accounts corresponding to the goals of building or purchasing the garage 85 or the car 87. In some embodiments, a location of the member may be used to build or deconstruct a build. Indeed, as the member is using the AR/VR display system 15, the member may be able to physically walk through or otherwise proceed through a timeline of transactions associated with a saving balance associated with the goal of the garage 85 or the car 87. Sensors may be used to determine a location of the member in the AR/VR display system 15 and cause builds to be filled or unfilled in accordance with the location of the member. In other words, physical positioning of a user (or the AR/VR display system 15) in space may correlate to a virtual point in time. Thus, as a user walks from a first point to a second point, virtual construction may occur as though the user is rapidly transitioning through time. Data (e.g., a note that a down payment is due) related to each point in time may also be displayed in the virtual space.

In some embodiments, the AR/VR display system 15 is used to indicate a visualization of a realization of a growth of an investment via presentation of virtual imagery of graphs (e.g., virtual bar graphs or line graphs that can be explored in a virtual three-dimensional space). However, showing progress towards more complete builds may be a preferred encouragement for users. Indeed, very specific details may be provided to give a sense of realism. As a specific example, as a user may provide actual blue prints for a house to use for modeling and defining a build. Using such modeling, as the user progresses towards more savings (e.g., as determined by an amount of savings identified in an account or based on predicted savings as a user virtually progresses through time), a more realistic and observable virtual presentation may be provided. For example, a virtual representation of three-dimensional blue prints may transition to a realistic virtual model of a house, as viewed through the AR/VR display system 15. This may provide a strong encouragement for savings.

In the illustrated embodiment, an indication 88 of a savings percentage 90 towards the garage is displayed and a savings percentage 92 towards the car is also presented on the display 80. As indicated, the amount of savings that the member has towards the new garage is equivalent to 0% while the amount of savings that the member has saved towards the new car is 15%. The garage 85 is still a fully ghost build while the car 87 has at least a wheel 94 that is filled with substance. The wheel 94 is filled because the member has saved a percentage towards the car 87. If the member for example removes funds from the savings towards the car 87, the wheel may likewise become un-built (e.g., a ghosted version). When the member saves 100% of the savings goal of the car 87, the build of the car 87 may become fully filled.

Figure 5:
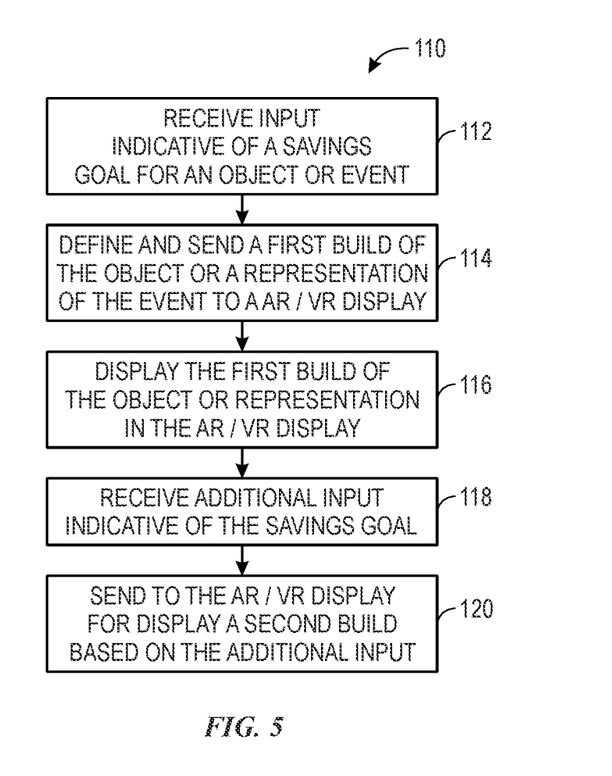
FIG. 5 illustrates a method for determining and providing risk information of objects, in accordance with embodiments described herein.

FIG. 5 illustrates a method 110 for causing a virtual reality display system to display builds of an object, in accordance with embodiments described herein. The method may be stored as computer-readable and/or processor-executable instructions and likewise may be performed by one or more components of the system 10 of FIG. 1 (e.g., the controller 14, the AR/VR display system 15).

The method 110 includes receiving (block 112) input indicative of a savings goal for a particular object or event. The input may be received via input on a phone (e.g., text, voice input) and may be transmitted to the controller 14. The input may include data corresponding to the object (e.g., a make or model of a car, a specific house, a vacation, an experience) and an amount which the member desires to save into an account created for the member's savings towards the particular object. In an embodiment, the input may include actual blue prints or designs for an object, modeling information, imagery, or user-selected data to facilitate establishing a build.

The method 110 includes defining and sending (block 114), to a virtual reality and/or augmented reality display system, a first build of the particular object based on the input data. The first build may correspond to a ghost version of the particular object or of an abstract illustration of an event. In some embodiments, the ghost version may be a blueprint or an outline of the particular object. If the savings account has no balance, then the first build may be a ghost version of the particular object because the member has not saved any amount towards the particular object.

The method 110 includes causing display (block 116) of the first build of the particular object in the virtual reality display system. For example, the controller may send a command for the virtual reality display system to activate and display the first build of the particular object. The virtual reality display system may activate based on the command sent by the controller 14 and display the first build of a particular object.

The method 110 also includes receiving (block 118) second input indicative of a change in a difference between a savings balance in a savings goal for the particular object. For example, the second input may be received from a computing system that is configured to detect an amount deposited into a saving account corresponding to the savings goal or a detection of an amount withdrawn from an account corresponding to the savings goal. The method 110 then includes sending (block 120) to the virtual and/or augmented reality display system a second build of the particular object based on the received second input and causing the virtual reality display system to display the second build of the particular object. When the second input is indicative of the difference between the savings balance and the savings goal being decreased, the second build may include the first build and at least a portion of the first build filled. When the second input is indicative of the difference between the savings balance and the savings goal increasing, the second build may be more unfilled than the first build.

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A tangible, non-transitory, and computer readable medium storing instructions that, when executed by a processor of a computing device, causes the computing device to perform operations comprising:
receiving input indicative of a saving goal for a particular object;
sending to a virtual reality display system, a first build of the particular object, wherein the first build corresponds to a ghost version of the particular object;
causing display of the first build of the particular object in the virtual reality display system;

receiving second input indicative of a change in a difference between a savings balance and the saving goal for the particular object;

sending to the virtual reality display system a second build of the particular object;

causing the virtual reality display system to display the second build of the particular object;

determining a physical location of a user of the virtual reality display system, wherein a first physical location of the user correlates to a first virtual point in time associated with the first build and a second physical location of the user correlates to a second virtual point in time associated with the second build; and causing the virtual reality display system to display either the first build or the second build based on the physical location of the user.

2. The tangible, non-transitory, and computer readable medium of claim 1, wherein the second input indicative of the change in the difference between the savings balance and the saving goal for the particular object comprises a decrease in the difference between the savings balance and the saving goal for the particular object, and wherein the second build comprises the first build and at least a portion of the first build filled.

3. The tangible, non-transitory, and computer readable medium of claim 1, wherein the object comprise a vacation trip.

* * * * *